(12) United States Patent
Spencer et al.

(10) Patent No.: US 8,858,234 B2
(45) Date of Patent: Oct. 14, 2014

(54) DISTORTION TRAINING TABLE

(71) Applicant: Toyota Motor Engineering & Manufacturing North America, Inc, Erlanger, KY (US)

(72) Inventors: Steven J. Spencer, Frankfort, KY (US); Shawn W. Clark, Morehead, KY (US); William H. Preece, Georgetown, KY (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 95 days.

(21) Appl. No.: 13/752,651

(22) Filed: Jan. 29, 2013

(65) Prior Publication Data

US 2014/0212852 A1    Jul. 31, 2014

(51) Int. Cl.
*A47B 13/08* (2006.01)
*G09B 19/00* (2006.01)

(52) U.S. Cl.
CPC ............... *A47B 13/08* (2013.01); *G09B 19/00* (2013.01)
USPC ......................................................... 434/219

(58) Field of Classification Search
USPC .................. 434/219, 365; 269/21; 294/65
See application file for complete search history.

(56) References Cited

U.S. PATENT DOCUMENTS

| | | | | |
|---|---|---|---|---|
| 4,753,104 | A * | 6/1988 | Strozier | 72/457 |
| 6,536,250 | B1 * | 3/2003 | Borchert | 72/37 |
| 2011/0194906 | A1 * | 8/2011 | Allen et al. | 409/201 |

FOREIGN PATENT DOCUMENTS

| | | |
|---|---|---|
| JP | 9329401 A | 12/1997 |
| WO | 2005/057204 A1 | 6/2005 |
| WO | WO 2005057204 A1 * | 6/2005 |

OTHER PUBLICATIONS

"Improving Surface Defect Detection for Quality Assessment of Car Body Panels," Doring et al., Mathware & Soft Computing 11 (2004) pp. 163-177.*
"Detection of Surface Defects on Sheet Metal Parts Using One-Shot Deflectometry in the Infrared Range," Sarosi et al., FLIR Technical Series, Application Note for Research & Science, http://www.photonicsonline.com/doc/detection-of-surface-defects-on-sheet-metal-0001, Jun. 3, 2011.*
"Easel," http://web.archive.org/web/20120108180920/http://photo-dictionary.com/phrase/6109/easel.html, Jan. 8, 2012.*

* cited by examiner

*Primary Examiner* — Sam Yao
*Assistant Examiner* — Jennifer L Fassett
(74) *Attorney, Agent, or Firm* — Christopher G. Darrow; Young Basile Hanlon MacFarlane, P.C.

(57) ABSTRACT

An apparatus and methods for training workers to recognize distortions. One example method includes positioning vacuum arms on a tilt-table top of a distortion training table situated in a horizontal position. The method further includes positioning locator arms on the tilt-table top in proximity to the vacuum arms, positioning a body panel on the locator arms to situate an inner surface of the body panel adjacent to each of the vacuum arms, applying suction to the inner surface of the body panel using the vacuum arms wherein the suction creates non-destructive distortions on an outer surface of the body panel, instructing the workers in tactile recognition of the distortions on the outer surface of the body panel, moving the tilt-table top from the horizontal position to a vertical position, and instructing the workers in visual recognition of the distortions on the outer surface of the body panel.

11 Claims, 5 Drawing Sheets

DISTORTION TRAINING TABLE

BACKGROUND

During the manufacture and assembly of vehicles, the outer surfaces of body panels can be damaged, causing distortions or flaws. These distortions and flaws can be magnified by the painting process, but are often difficult to detect on unpainted body panels. Failure to catch even the smallest defect can lead to scrapping the body panels after significant cost has been incurred in painting and assembly. Hence, many workers are trained to detect defects or distortions on the outer surfaces of body panels early in the assembly process.

A novel apparatus and methods of using the apparatus to train workers to recognize defects in vehicle body panels are described below.

SUMMARY

An apparatus and method for training workers to recognize distortions on vehicle body panels.

One aspect of the disclosed embodiments is a distortion training table apparatus. The apparatus includes a tilt-table top; a plurality of locator arms disposed on a top surface of the tilt-table top wherein a body panel can be positioned on at least some of the locator arms; and a plurality of vacuum arms disposed on the top surface of the tilt-table top in proximity to at least some of the locator arms wherein each of the vacuum arms can apply suction to an inner surface of the body panel to create non-destructive distortions on an outer surface of the body panel.

Another aspect of the disclosed embodiments is a method for training workers. The method includes positioning a plurality of vacuum arms on a distortion training table; positioning a plurality of locator arms on the distortion training table in proximity to at least some of the vacuum arms; positioning a body panel on at least some of the locator arms to situate an inner surface of the body panel adjacent to at least some of the vacuum arms; applying suction to the inner surface of the body panel using at least some of the vacuum arms wherein the suction creates non-destructive distortions on an outer surface of the body panel; and instructing the workers to recognize the distortions on the outer surface of the body panel.

Another aspect of the disclosed embodiments is a method for training workers. The method includes positioning a plurality of vacuum arms on a tilt-table top of a distortion training table wherein the tilt-table top is situated in a horizontal position; positioning a plurality of locator arms on the tilt-table top in proximity to at least some of the vacuum arms; positioning a body panel on at least some of the locator arms to situate an inner surface of the body panel adjacent to at least some of the vacuum arms; applying suction to the inner surface of the body panel using at least some of the vacuum arms wherein the suction creates non-destructive distortions on an outer surface of the body panel; instructing the workers in tactile recognition of the distortions on the outer surface of the body panel; moving the tilt-table top from the horizontal position to a vertical position; and instructing the workers in visual recognition of the distortions on the outer surface of the body panel.

BRIEF DESCRIPTION OF THE DRAWINGS

The description herein makes reference to the accompanying drawings wherein like reference numerals refer to like parts throughout the several views, and wherein.

DETAILED DESCRIPTION

A distortion training table and methods for training workers using the distortion training table are described here. The distortion training table includes a tilt-table top allowing a body panel of a vehicle to be displayed to workers and training personnel in both horizontal and vertical inspection positions. The distortion training table also includes a plurality of vacuum arms extending from the tilt-table top for providing varying levels of suction to an inner surface of the body panel. The suction can create non-destructive distortions, e.g. defects or deformations, of varying size and location on the outer surface of the body panel. Training personnel can instruct vehicle assembly workers through both visual and tactile recognition to detect a wide variety of distortion shapes and sizes in vehicle body panels without the need to scrap the body panels used during training.

Figure 1:
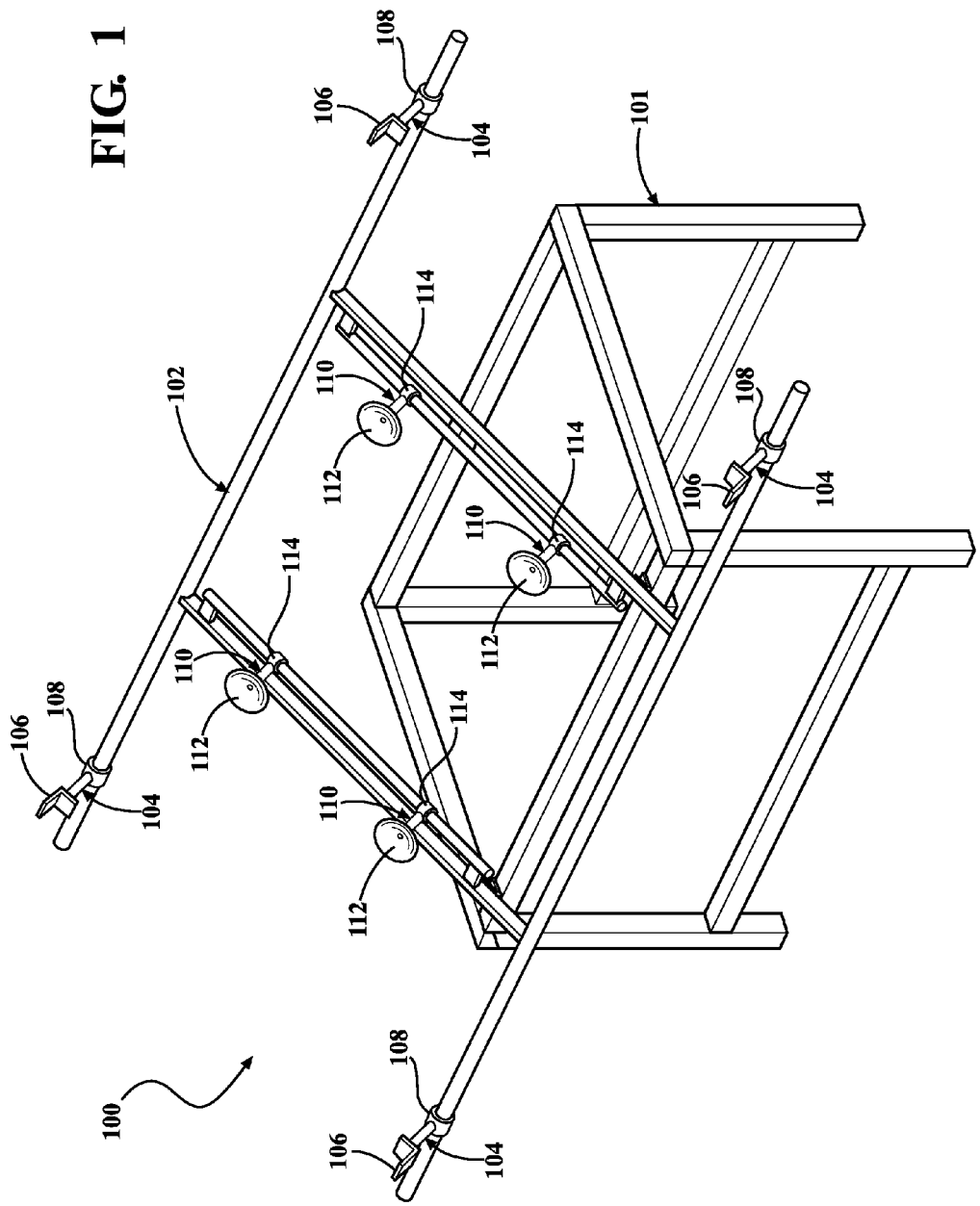
FIG. 1 is a perspective view of a distortion training table with a tilt-table top in a mid-tilt position.

FIG. 1 is a perspective view of a distortion training table 100 with a table base 101 and a tilt-table top 102 in a mid-tilt position. The tilt-table top 102 can pivot between a horizontal position parallel to a top surface of the table base 101 and a vertical position perpendicular to the top surface of the table base 101. In the example distortion training table 100 shown in FIG. 1, the pivot is located along one edge of the table base 101 and one edge of the tilt-table top 102, though other pivot configurations are possible.

The distortion training table 100 includes a plurality of locator arms 104 disposed on the tilt-table top 102. The locator arms 104 allow a body panel 400, FIG. 4, to be positioned on the tilt-table top 102 when the tilt-table top 102 is in the horizontal position or the mid-tilt position. At least some of the locator arms 104 can include brackets 106 for engaging edges of the body panel 400 being positioned on the tilt-table top 102. At least some of the locator arms 104 can also include means for changing position in relation to the body panel 400.

One example means for changing the position of the locator arm 104 is a slide mount 108 which can move along a frame member or other portion of the tilt-table top 102 to position the locator arm 104 to properly hold different shaped body panels. As another example, a locator arm 104 can include a pivot mount (not shown) which can rotate the locator arm 104 in respect to the tilt-table top 102 to position the locator arm 104. Example body panels 400 include sheet metal door panels, roof panels, hood panels, fender panels, and a variety of other panels having different shapes and sizes. Differences between body panels make adjustability of the locator arms 104 an important feature for the distortion training table 100.

The distortion training table 100 also includes a plurality of vacuum arms 110 disposed on the tilt-table top 102 in proximity to at least some of the locator arms 104. For example, the locator arms 104 can be attached to two parallel frame members making up two sides of the tilt-table top 102 and the vacuum arms 110 can be attached to two different parallel frame members making up the other two sides of the tilt-table top 102 as shown in FIG. 1. Other configurations of the tilt-table top 102 are also possible.

Each of the vacuum arms 110 can apply suction to an inner surface of a body panel to create non-destructive distortions on an outer surface of the body panel. In order to create non-destructive distortions, each of the vacuum arms 110 can include a suction cup 112 for engaging a body panel. At least some of the vacuum arms 110 can include means for connecting a source of pressurized air to the suction cups 112. The size of the non-destructive distortions can vary based on the amount of suction applied to the body panel.

For example, the end of a vacuum line can be disposed in an opening in the suction cup 112, and the vacuum line can extend through the body of the vacuum arm 110 to a fitting on the outside of the vacuum arm 110 for connection to a vacuum pump mechanism (not shown). The amount of suction applied can determine how large or small of distortion is created on the outer surface of the body panel 400. Other methods of creating suction between the vacuum arms 110 and body panel 400 are also possible.

At least some of the vacuum arms 110 can also include means for changing position in relation to the body panel 400. One example means for changing the position of a vacuum arm 110 is a pivot mount 114 which can rotate the vacuum arm 110 in respect to the tilt-table top 102 to position the vacuum arm 110. As another example, the vacuum arm 110 can include a slide mount which can move the vacuum arm 110 along a frame member or other portion of the tilt-table top 102.

The locator arms 104 can be positioned to receive a body panel 400 having a specific size and shape. The vacuum arms 110 can be positioned to create distortions at locations specified by training personnel. Once the body panel 400 is mounted to the distortion training table 100 and suction is applied using the vacuum arms 110, workers can be instructed in tactile recognition of the distortions when the tilt-table top 102 is in the horizontal position. Then, the tilt-table top 102 can be pivoted to the vertical position, and workers can be instructed in visual recognition of the distortions.

Figure 2:
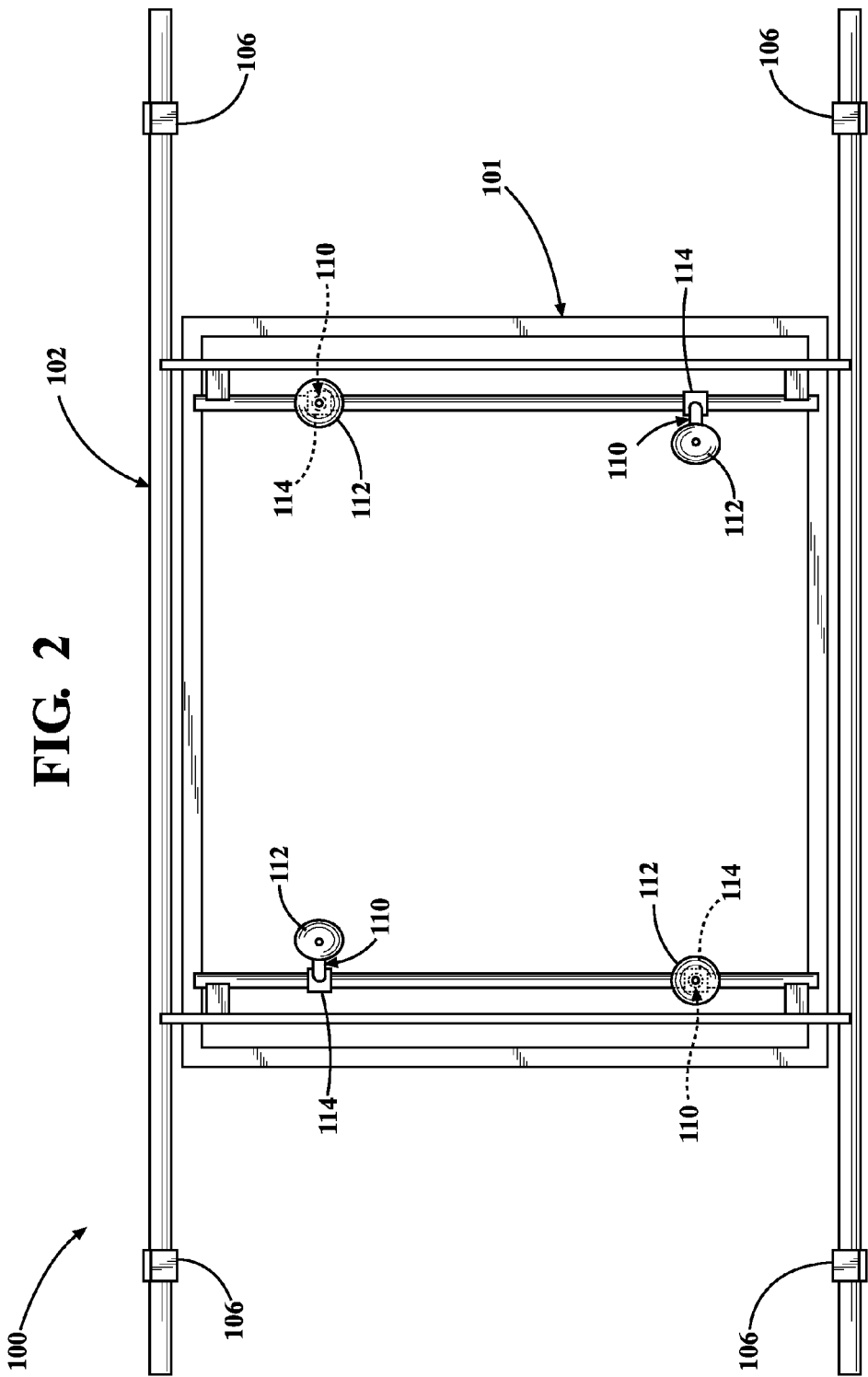
FIG. 2 is a top view of the distortion training table of FIG. 1 with the tilt-table top in a horizontal position.

FIG. 2 is a top view of the distortion training table 100 of FIG. 1 with the tilt-table top 102 in a horizontal position. The brackets 106 are the only portion visible of the locator arms 104 since the locator arms 104 in this example extend perpendicularly from the tilt-table top 102. The vacuum arms 110 are each positioned at various angles in respect to the tilt-table top 102 and the locator arms 104. Each suction cup 112 and pivot mount 114 is also visible, and the suctions cups 112 are positioned to interface with an inner surface of a body panel 400. The horizontal position of the tilt-table top 102 allows for ease of loading a body panel 400 onto the distortion training table 100 as well as for ease of changing the positions of the locator arms 104 and vacuum arms 110 as needed to accommodate body panels of various shapes and sizes.

Figure 3:
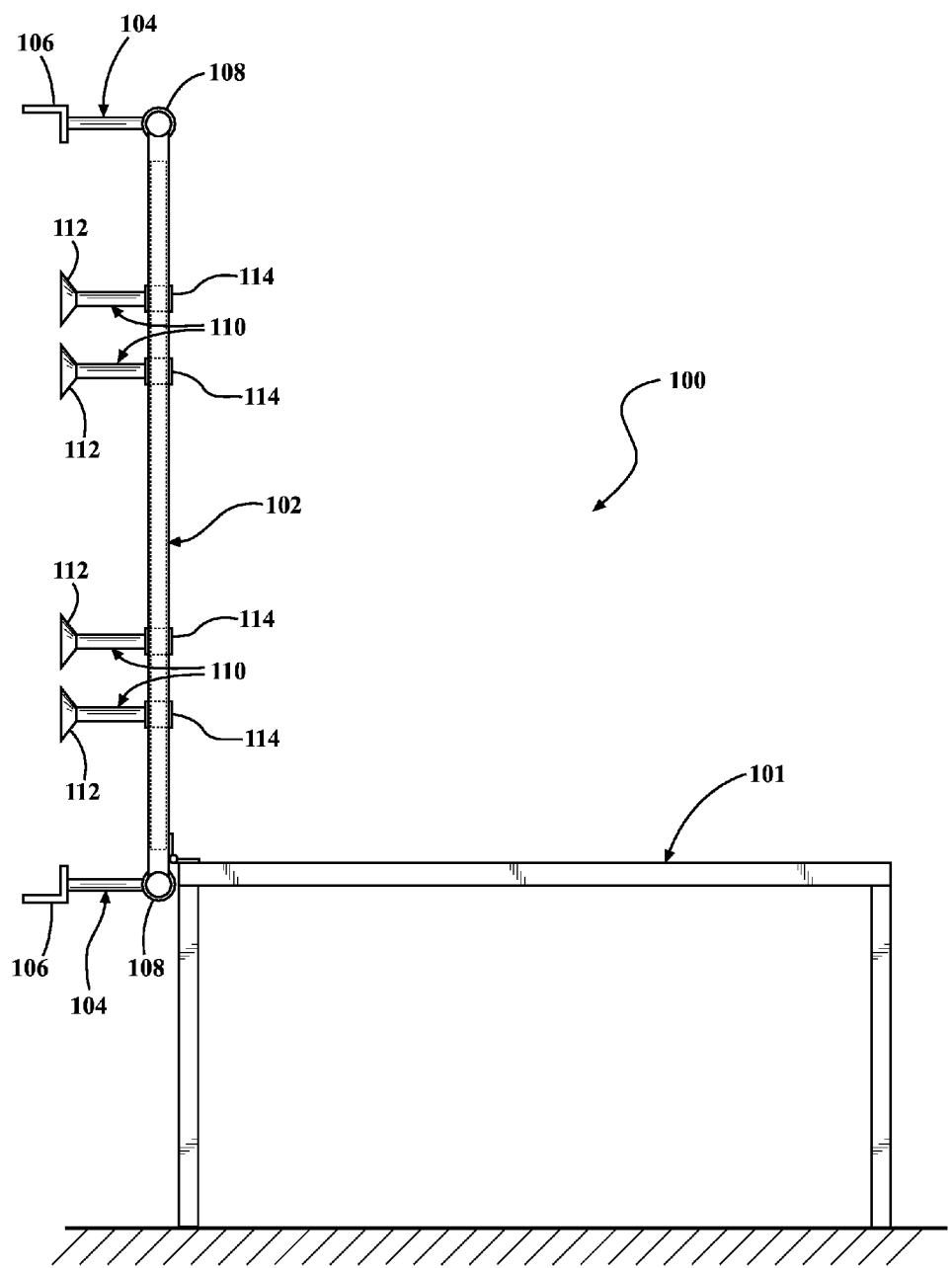
FIG. 3 is a side view of the distortion training table of FIG. 1 with the tilt-table top in a vertical position.

FIG. 3 is a side view of the distortion training table 100 of FIG. 1 with the tilt-table top 102 in a vertical position. The locator arms 104 extend perpendicularly from the tilt-table top 102 and are connected to the tilt-table top 102 using slide mounts 108. The brackets 106 at the ends of the locator arms 104 are angled to assist in holding a body panel 400 between them. The vacuum arms 110 extend at various angles from the tilt-table top 102 and are connected to the tilt-table top 102 using pivot mounts 114. The suction cups 112 at the ends of the vacuum arms 110 are positioned to interface with an interior surface of a body panel 400. The vertical position of the tilt-table top 102 allows for ease of visual inspection of a body panel 400, for example, a door panel, in a typical build position encountered during the vehicle assembly process.

Figure 4:
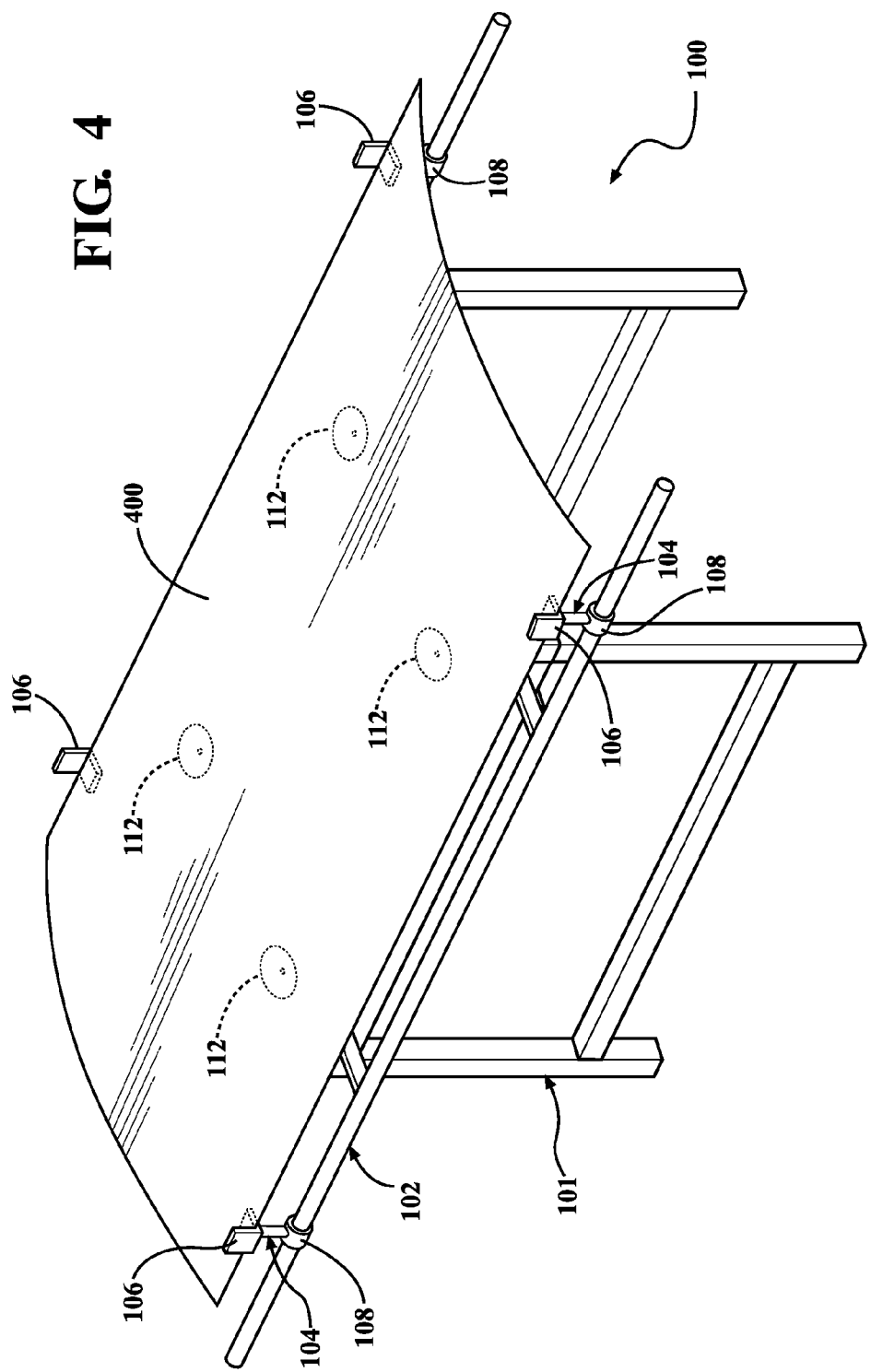
FIG. 4 is a perspective view of the distortion training table of FIG. 1 with the tilt-table top in a horizontal position and a body panel fixed to the tilt-table top.

FIG. 4 is a perspective view of the distortion training table 100 of FIG. 1 with the tilt-table top 102 in a horizontal position and a body panel 400 fixed to the tilt-table top 102. The body panel 400 shown in FIG. 4 includes linear edges each having some curvature. The body panel 400 can be, for example, a door outer panel or a roof panel. Four brackets 106 are shown at the ends of four locator arms 104 holding the body panel 400 in position over four suction cups 112 shown in dotted-line shadow below the body panel 400. The locator arms 104 are fixed to the tilt-table top 102 with slide mounts 108. The position of the locator arms 104 can be adjusted both in mounting location along the tilt-table top 102 and in height or distance from the tilt-table top 102.

Figure 5:
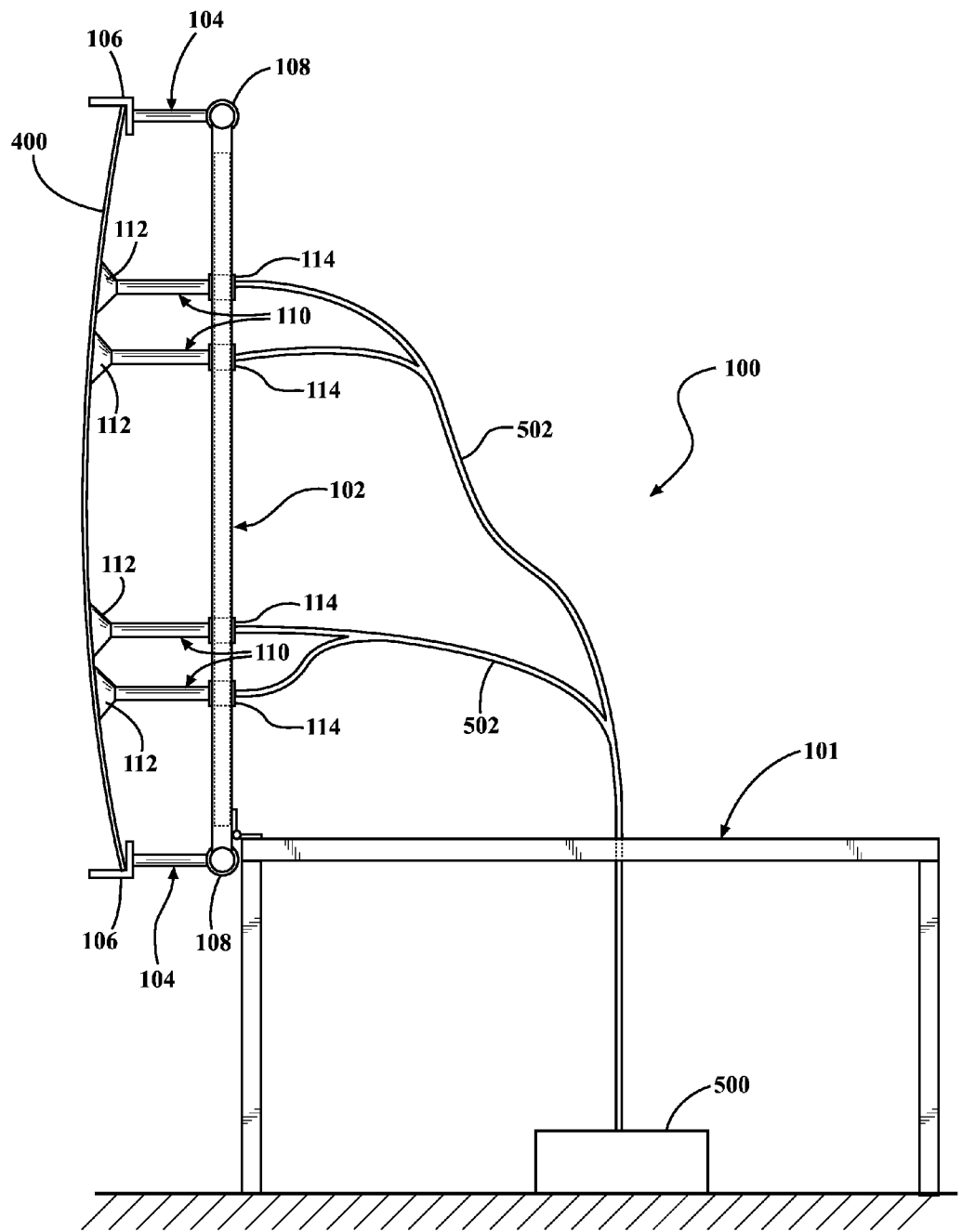
FIG. 5 is a side view of the distortion training table of FIG. 1 with the tilt-table top in a vertical position and a body panel fixed to the tilt-table top.

FIG. 5 is a side view of the distortion training table 100 of FIG. 1 with the tilt-table top 102 in a vertical position and a body panel 400 fixed to the tilt-table top 102. A pressurized-air source 500, for example, a vacuum pump, has been disposed below the distortion training table 100. A plurality of vacuum lines 502 extend from the pressurized-air source 500 to the vacuum arms 110. As described above, the vacuum lines 502 can also extend from fittings on the outside of the vacuum arms 110 through the bodies of the vacuum arms 110 up to the suction cups 112.

When a vacuum is created at the suction cups 112 using the pressurized-air source 500, the suction cups 112 engage the inner surface of the body panel 400, allowing it to remain in a fixed position even when the tilt-table top 102 is in a vertical position. The amount of pressure or suction can be varied, for example, by the use of one or more air valves associated with the pressurized-air source 500. A fairly low amount of suction can hold the body panel 400 in position against the brackets 106 and suction cups 112. A higher amount of suction can create non-destructive distortions within the body panel 400. The size and shape of the distortions can be varied with the amount of suction used. Further, the location of the distortions can be varied based on the positioning of the vacuum arms 110.

One example method of using the distortion training table described in FIGS. 1-5 above to train workers includes positioning a plurality of vacuum arms 110 on the distortion training table 100 and positioning a plurality of locator arms 104 on the distortion training table 100 in proximity to at least some of the vacuum arms 110. The locator arms 104 and vacuum arms 110 can be positioned to accommodate a body panel 400 having a specific shape and size. At least some of the locator arms 104 can include a bracket 106 for engaging the body panel and at least some of the vacuum arms 110 can include a suction cup 112 for engaging the body panel by applying a source of pressurized air 500 to the suction cups 112.

The method can also include positioning a body panel 400 on at least some of the locator arms 104 to situate an inner surface of the body panel 400 adjacent to at least some of the vacuum arms 110. As described above, least some of the vacuum arms 110 and some of the locator arms 104 include means for changing position in relation to the body panel 400. For example, both the locator arms 104 and vacuum arms 110 can be fixed to the tilt-table top 102 using slide mounts 108 or pivot mounts 114. Once the body panel 400 is positioned on the locator arms 104, the method can further include applying suction to the inner surface of the body panel 400 using at least some of the vacuum arms 110 having suction cups 112. The suction can also be used to create non-destructive distortions on an outer surface of the body panel 400. As described above, the size of the non-destructive distortions can vary based on the amount of suction applied to the body panel 400.

The method can also include instructing the workers to recognize the distortions on the outer surface of the body panel 400. Training personnel can instruct the workers in tactile recognition of the distortions when the tilt-table top 102 of the distortion training table 100 is in a horizontal position and in visual recognition of the distortions when the tilt-table top 102 of the distortion training table 100 is in a vertical position. After training personnel complete the step of instructing the workers to recognize the distortions, the method can include removing suction to disengage the vacuum arms 110 and to remove the non-destructive distortions from the outer surface of the body panel 400.

Another example method of using the distortion training table 100 described in FIGS. 1-5 above to train workers includes positioning a plurality of vacuum arms 110 on a tilt-table top 102 of a distortion training table 100. The tilt-table top 102 is situated in a horizontal position. The method further includes positioning a plurality of locator arms 104 on the tilt-table top 102 in proximity to at least some of the vacuum arms 110. The method further includes positioning a body panel 400 on at least some of the locator arms 104 to situate an inner surface of the body panel 400 adjacent to at least some of the vacuum arms 110.

Once the body panel 400 is positioned, the method can further include applying suction to the inner surface of the body panel 400 using at least some of the vacuum arms 110. The suction can create non-destructive distortions on an outer surface of the body panel 400. The method can further include instructing the workers in tactile recognition of the distortions on the outer surface of the body panel 400. Next, the method can include moving the tilt-table top 102 from the horizontal position to a vertical position and instructing the workers in visual recognition of the distortions on the outer surface of the body panel 400. Each of the methods described above can be practiced on the distortion training table 100 shown in FIGS. 1-5.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for training workers, comprising:
    positioning a plurality of vacuum arms on a to surface of a distortion training tilt-table top;
    positioning a plurality of locator arms on the to surface of a distortion training tilt-table top in proximity to at least some of the vacuum arms;
    positioning a body panel on at least some of the locator arms to situate an inner surface of the body panel adjacent to at least some of the vacuum arms;
    applying suction to the inner surface of the body panel using at least some of the vacuum arms wherein the suction creates non-destructive distortions on an outer surface of the body panel; and
    instructing the workers to recognize the distortions on the outer surface of the body panel.

2. The method of claim 1 wherein at least some of the vacuum arms include a suction cup for engaging the body panel.

3. The method of claim 2 wherein at least some of the vacuum arms include means for connecting a source of pressurized air to the suction cups.

4. The method of claim 1 wherein at least some of the locator arms include a bracket for engaging the body panel.

5. The method of claim 1 wherein at least some of the vacuum arms and some of the locator arms include means for changing position.

6. The method of claim 1 wherein the size of the non-destructive distortions can vary based on the amount of suction applied to the body panel.

7. The method of claim 1 wherein the distortion training tilt-table top has a horizontal position and a vertical position.

8. The method of claim 7 wherein instructing the workers includes training the workers in tactile recognition of the distortions when the tilt-table top is in the horizontal position.

9. The method of claim 7 wherein instructing the workers includes training the workers to visually recognize the distortions when the tilt-table top is in the vertical position.

10. The method of claim 1, further comprising:
    after instructing the workers to recognize the distortions, removing suction to disengage the vacuum arms and to remove the non-destructive distortions from the outer surface of the body panel.

11. A method for training workers, comprising:
    positioning a plurality of vacuum arms on a tilt-table top of a distortion training table wherein the tilt-table top is situated in a horizontal position;
    positioning a plurality of locator arms on the tilt-table top in proximity to at least some of the vacuum arms;
    positioning a body panel on at least some of the locator arms to situate an inner surface of the body panel adjacent to at least some of the vacuum arms;
    applying suction to the inner surface of the body panel using at least some of the vacuum arms wherein the suction creates non-destructive distortions on an outer surface of the body panel;
    instructing the workers in tactile recognition of the distortions on the outer surface of the body panel;
    moving the tilt-table top from the horizontal position to a vertical position; and
    instructing the workers in visual recognition of the distortions on the outer surface of the body panel.

\* \* \* \* \*